March 18, 1952  C. E. WIEGAND  2,590,057
HALF-LIFE DETERMINING METHOD
Filed June 28, 1950

3a

3b

3c

INVENTOR.
CLYDE E. WIEGAND
BY Roland A. Anderson
ATTORNEY.

Patented Mar. 18, 1952

2,590,057

UNITED STATES PATENT OFFICE 2,590,057

HALF-LIFE DETERMINING METHOD

Clyde E. Wiegand, Oakland, Calif., assignor to the United States of America as represented by the United States Atomic Energy Commission Application June 28, 1950, Serial No. 170,873

6 Claims. (Cl. 250—83.6)

The present invention relates to a counting method and more particularly pertains to an improved method and means for accurately determining the rate of change of a non-linear physical phenomenon such as, for example, radioactive decay.

The determination of the half-life of radioactive materials, and of similar non-linear functions, is commonly accomplished by impressing indicia of the phenomenon, such as radiation pulses from the material, upon an oscilloscope, and visually determining the time delay between the individual indications. Very short-lived phenomena have been studied by photographing the oscilloscope trace in order to preserve the indicia, and also electronic means including gate circuits have been employed for the purpose of determining the time between pulses. Both of these systems have proven unsatisfactory in the study of rapidly varying phenomena, such as, for example, radioactivity having a half-life of some fraction of a second, owing to the difficulty of accurately determining a sufficient number of indicia to properly identify the phenomena throughout its duration.

The present invention electronically indicates the magnitude of the phenomenon under test at a plurality of times throughout its existence and provides data from which a curve may be readily plotted. For example, the embodiment of the invention illustrated is capable of providing information for the accurate plotting of the decay curve of a radioactive material having a half-life of the order of one millisecond.

It is accordingly an object of the present invention to provide an improved method and means for the determination of instantaneous values of transient phenomena.

It is another object of the present invention to provide an improved method and means for accurately indicating a plurality of instantaneous values of transient phenomena.

It is another object of the present invention to provide an improved method and means for counting the number of pulses emitted from a radioactive sample within each of a plurality of known time intervals.

It is a further object of the present invention to provide an improved method of determining the half-life of radioactive materials.

It is a still further object of the present invention to provide an improved method and means for indicating the number of counts per unit time for a plurality of times of radioactive materials having half-lives ranging from one millisecond to many seconds.

It is yet another object of the present invention to provide an improved method and means for indicating the radiation level of radioactive materials during very small contiguous time intervals.

Yet another object of the present invention is to provide an improved method and means for accurately determining radioactive decay curves and half-lives of radioactive materials.

Numerous other purposes and advantages of the invention will become apparent from the following disclosure and appended drawings wherein.

Figure 2:
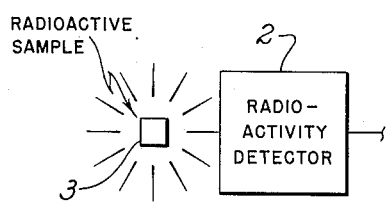
Fig. 2 is a block diagram of alternate detector means.
Figure 2:
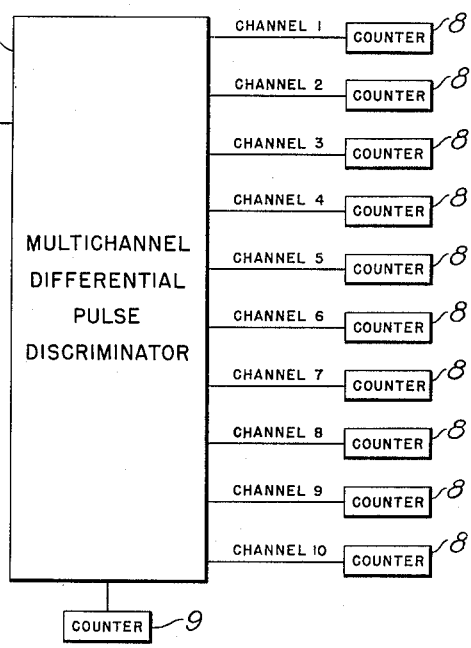
Figure 3:
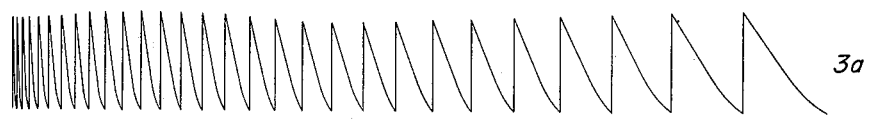
Fig. 3 is a series of waveforms depicting the signal at particular points in the apparatus.
Figure 3:
Figure 3:
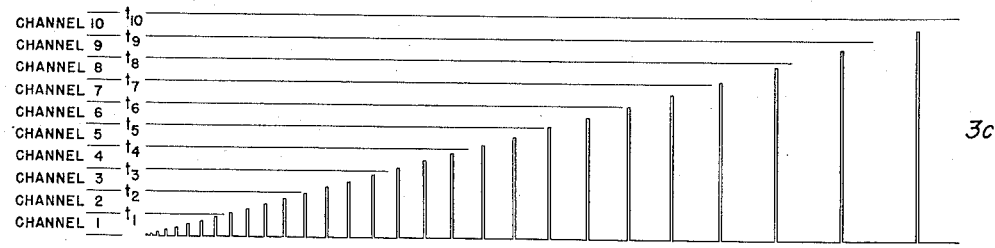

Considering the composition and operation of the invention with reference to the attached drawings, it will be seen that signals from a transient phenomenon to be measured are produced at a detector 1 which may, for example, comprise a current viewing resistor in a pulse line (not shown) or may, as illustrated in Fig. 2, comprise a radioactivity detector 2 adjacent or surrounding radioactive material 3. The output signals from detector 1, which may have a waveshape as shown at Fig. 3a, are applied to a discriminator 4 which operates to produce square wave pulses of a constant amplitude and of a duration equal or proportionate to the pulses from detector 1; for example as shown at Fig. 3b. Following discriminator 4 is a height varying circuit 6 into which are fed the pulses from discriminator 4 and whch produces pulses corresponding in time to those received but having amplitudes proportional to the individual pulse times of the input pulses.

One circuit which is adaptable for use as the height varying circuit of the present invention is shown in Division V, volume 1, of the Nuclear Energy Series, entitled Electronics, and therein named "sliding pulser." It will of course be appreciated that any one of numerous other circuits may be employed for the purpose of the height varying circuit 6 and that the above circuit is identified only as an example, with no limitation being intended thereby.

Figure 1:
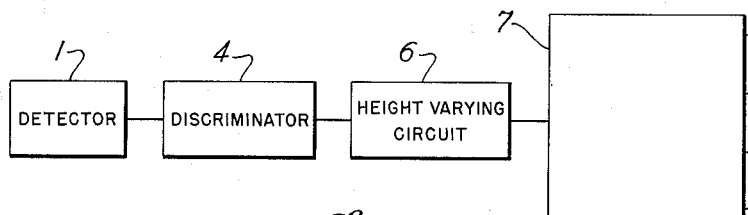
Figure 1 is a block diagram of the apparatus.

The output of height varying circuit 6, which may have the form shown at Fig. 3c, is applied to a multichannel differential pulse discriminator 7 having a counter 8 associated with each channel and a counter 9 for indicating the total number of counts received, all as shown in Fig. 1. Differential pulse discriminator 7 may be of a conventional type employing simple discriminators and associated coincidence circuits; however, the use of "lock-in-discriminators" and a delayed registering pulse has proven advantageous. Such a differential discriminator counts the most highly biased channel triggered and provides a reset pulse to clear the individual channel discriminators for the next input pulse and thereby precludes coincidence counting by decay of input pulses. The illustrated multichannel differential pulse discriminator 7 has ten channels; however, any desired number of channels may be employed with ten being merely a compromise between a simpler apparatus having too few channels to provide adequate information and one providing more detailed information but having the disadvantage of greater complexity.

Considering the operation of the device in more detail with respect to the determination of radiation decay curves and half-life calculations, it will be noted that the radiation pulses from a radioactive sample 3 under test are accepted by radiation detector 2 which produces peaked pulses proportionate to this radiation, as shown at Fig. 3a. These pulses are fed into discriminator 4 which produces constant amplitude square wave pulses having individual cycles equal to the corresponding individual cycles of the detector pulses, as may be noted from a comparison of Figs. 3a and 3b.

Height varying circuit 6 produces an output pulse for each input pulse and these output pulses have maximum values which are individually proportional to the duration of the pulse cycle of corresponding input pulses. Thus the progressively varying pulse times or cycles of the signal from discriminator 4 are changed to corresponding progressively varying pulse magnitudes by height varying circuit 6. Convenient adjustment means are provided to adjust the time required for the pulses produced by height varying circuit 6 to vary from zero to some predetermined maximum value. Thus the time lapse between the first and last pulse from height varying circuit 6, as depicted by the entire length of Fig. 3c is predeterminable.

The bias voltages employed in the individual channels of differential pulse discriminator 7 are chosen as precise fractions of the maximum voltage from height varying circuit 6 and thus they correspond to the same fraction of the total time lapse during which height varying circuit 6 is producing output pulses. The functional relationship between differential pulse discriminator 7 and height varying circuit 6 is indicated in Fig. 3c wherein the number of pulses counted in the various channels of differential pulse discriminator 7 is indicated by the number of pulses lying between the horizontal lines extending from the channel designations at the left of the figure.

Figure 4:
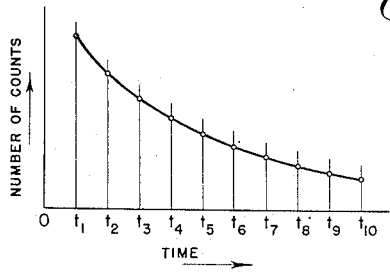
Fig. 4 is a graph representing a radioactive decay curve as might be produced from data determined with the apparatus of Fig. 1.

For example, if the voltage range of height varying circuit 6 is from 0–20 volts in 5 seconds, the bias on the channels of differential pulse discriminator 7 would be 2, 4, 6, 8 volts, etc. which would correspond to times of 0.5, 1.0, 1.5, 2.0 seconds, etc. The number of counts recorded by the counter of channel 1 would thus have occurred in the first half second and the counts recorded in channel 2 would have occurred in the next half second. From this data a curve of counts or pulses versus time may be readily constructed and information relative to the transient phenomenon obtained therefrom. A typical curve obtained from detecting and counting the radiation of a radioactive material is shown in Fig. 4, the points thereon corresponding to the points indicated in Fig. 3c, although not referring to any particular radioactivity.

With regard to the determination of half-lives of radioactive material, it is to be noted that it is not necessary to plot the curve described above, although the determination may be made therefrom. Instead, the relationship $$\tau = \frac{\Sigma N_t t}{N}$$

may be used, wherein:

$\tau$=mean life in seconds
$N_t$=number of counts per interval of time
$N$=total number of counts
$t$=time from origination of count to end of a particular interval, measured in seconds The limits of the above summation are zero and infinity, however, a close approximation may be made if the counting period greatly exceeds the mean life. Also, correction factors determined in a conventional manner may be employed to reduce the approximation error. It will, of course, be appreciated that the half-life is equal to the mean life multiplied by $\log_e 2$, and thus the half-life may be easily and rapidly obtained by calculations from the data provided by the present invention.

It will be appreciated that while the present invention is particularly advantageous in the determination of half-lives and radioactive decay curves, it is also adaptable and advantageous in numerous other applications, many of which will be readily evident to those skilled in the art. Thus, although the present invention has been disclosed with respect to a single preferred embodiment, no limitation is intended thereby and the true scope of the invention is to be measured only by the terms of the appended claims.

What is claimed is:

1. A method of measuring the half-life of a radioactive sample comprising the steps of detecting the individual quantum of radiation as a first pulsating electrical signal, producing a second electrical signal of predeterminable duration and having individual electrical pulses corresponding to the pulsations of said first electrical signal and of a magnitude proportional to the pulse interval of the corresponding pulsations of said first electrical signal, counting the total number of pulses in said electrical signal, and counting the number of pulses of said second electrical signal having magnitudes in a plurality of contiguous predeterminable ranges whereby the half-life of said radioactivity may be calculated therefrom.

2. A method of measuring radioactive half-lives comprising the steps of detecting radiation as a pulsating electrical signal, generating a series of electrical pulses for a known variable period of time, said electrical pulses corresponding to the pulsations of said electrical signal and having individual voltage magnitudes proportional to the time of the cycles of corresponding pulsations of said electrical signal, counting the total number of pulses generated during said period, establishing a plurality of voltage ranges which are known increments of the total voltage variation between zero and the largest of said generated pulses whereby said voltage ranges correspond to proportionate increments of the period in which pulses are generated, and counting the number of pulses having a magnitude in each of said voltage ranges whereby the half-life is determinable from division of the total number of counts into the summation of the product of the counts in each voltage range and the time interval from the start of counting to the end of counting in that range.

3. A method of measuring radioactive decay comprising detecting radioactivity and producing a pulsating electrical signal proportionate thereto, generating square wave voltage pulses proportionate to the pulsations of said electrical signal, varying the height of said square wave pulses in accordance with their duration, establishing a plurality of contiguous voltage ranges, and counting the number of said varying height pulses having maximum values in the various voltage ranges as a measure of the rate of decay of said radioactivity.

4. Measuring apparatus comprising detection means producing a pulsating electrical signal proportional to a phenomenon to be measured, a discriminator connected to said detector and reducing the pulsations of said electrical signal to a common maximum value, pulse generating means connected to said discriminator for producing pulses having maximum values proportional to the cycle duration of the individual pulsations of the electrical signal from said discriminator, and a multichannel differential pulse discriminator connected to said pulse generating means for indicating the number of pulses in a plurality of voltage ranges.

5. Measuring apparatus for indicating the variations in the recurrence rate of an intermittent phenomenon comprising detection means for producing an electrical signal proportional to the variations in the phenomena to be measured, discriminator means connected to said detector and adapted to translate pulsations in the electrical signal into constant amplitude square wave pulses having a width proportional to the width of corresponding pulsations of said electrical signal, a height varying circuit receiving said square wave pulses for varying the magnitude thereof proportionate to their width, and a multichannel differential pulse discriminator connected to said height varying circuit and including a plurality of channels with progressively greater voltage biases thereon and counting means associated with each of said channels for indicating the number of pulses having a magnitude within the voltage range of each channel.

6. Measuring apparatus for indicating radioactive decay comprising a radiation detector disposed adjacent a radioactive sample and adapted to produce an electrical signal proportional to the radiation pulses received, discriminator means for translating said electrical signal into constant value square wave pulses corresponding to fluctuations of sid signal, variable height pulse generator means producing pulses for a known period of time over a known voltage range, said generating means producing a pulse for each input pulse from said discriminator and the value thereof being proportional to the pulse duration of the corresponding discriminator pulse, and a multichannel differential pulse discriminator connected to said pulse generator and having a counter associated with each channel for counting the number of pulses having maximum values in different voltage ranges as an indication of the repetition rate of the pulses and therefore of the radiation to be measured.

CLYDE E. WIEGAND.

REFERENCES CITED

The following references are of record in the file of this patent:

UNITED STATES PATENTS

| Number | Name | Date |
|---|---|---|
| 2,529,666 | Sands | Nov. 14, 1950 |

OTHER REFERENCES

Device for the Measurement of Short Half-Lives, Studier AECD 2445, Mar. 12, 1947, pgs. 1–6.

Counting-Rate Meter, Gallagher et al., MDDC 1297, Oct. 7, 1946, pgs. 1–7.

A Pulse Analyzer for Nuclear Research, Rev. of Sci. Inst., vol. 18, No. 2, Feb. 1947, pgs. 90–100.

Ten-Channel Electrostatic Pulse Analyzer, Watkins, Rev. of Sci. Inst., July 1949, vol. 20, No. 7, pgs. 495–499, 235, publ. 61 HCR.